United States Patent
Xu et al.

(10) Patent No.: US 10,375,673 B2
(45) Date of Patent: Aug. 6, 2019

(54) METHOD AND APPARATUS FOR ENHANCING BROADCAST SERVICE

(71) Applicant: Nokia Solutions and Networks Oy, Espoo (FI)

(72) Inventors: Xiang Xu, Nanjing (CN); Henri Markus Koskinen, Espoo (FI); Tsunehiko Chiba, Saitama (JP)

(73) Assignee: Nokia Solutions and Networks Oy, Espoo (FI)

( * ) Notice: Subject to any disclaimer, the term of this patent is extended or adjusted under 35 U.S.C. 154(b) by 120 days.

(21) Appl. No.: 15/329,225

(22) PCT Filed: Aug. 4, 2014

(86) PCT No.: PCT/EP2014/066707
§ 371 (c)(1),
(2) Date: Jan. 25, 2017

(87) PCT Pub. No.: WO2016/019970
PCT Pub. Date: Feb. 11, 2016

(65) Prior Publication Data
US 2017/0223662 A1 Aug. 3, 2017

(51) Int. Cl.
H04W 72/00 (2009.01)
H04L 29/06 (2006.01)
H04W 4/06 (2009.01)
H04W 48/08 (2009.01)
H04W 84/04 (2009.01)

(52) U.S. Cl.
CPC ....... *H04W 72/005* (2013.01); *H04L 65/1069* (2013.01); *H04L 65/4076* (2013.01);
(Continued)

(58) Field of Classification Search
CPC ..... H04W 72/005; H04W 4/06; H04W 48/08; H04W 84/042; H04W 36/08;
(Continued)

(56) References Cited

U.S. PATENT DOCUMENTS

2008/0273503 A1* 11/2008 Lee ................... H04W 36/0055
370/336
2010/0263012 A1 10/2010 Huang et al.
(Continued)

FOREIGN PATENT DOCUMENTS

EP 2530858 A2 12/2012

OTHER PUBLICATIONS

International Search Report and Written Opinion received for corresponding Patent Cooperation Treaty Application No. PCT/EP2014/066707, dated Aug. 4, 2014, 20 pages.
(Continued)

*Primary Examiner* — Hardikkumar D Patel
(74) *Attorney, Agent, or Firm* — Nokia Technologies Oy

(57) ABSTRACT

A method and apparatus can be configured to receive an indication for support for a broadcast service enhancement layer from a first network node. The method may also comprise transmitting the indication for support for the broadcast service enhancement layer to a second network node. The method may also comprise receiving a broadcast service session request message from the second network node. The broadcast service session request message may indicate that a broadcast service session is for a base layer or for the enhancement layer.

20 Claims, 18 Drawing Sheets

(52) U.S. Cl.
CPC ............ *H04W 4/06* (2013.01); *H04W 48/08* (2013.01); *H04W 84/042* (2013.01)

(58) Field of Classification Search
CPC ..... H04W 48/16; H04W 72/04; H04W 48/12; H04W 48/20; H04W 8/205; H04W 24/08; H04W 24/10; H04W 84/02; H04W 72/042; H04W 36/0055; H04W 36/28; H04L 65/1069; H04L 65/4076; H04L 12/18; H04L 12/1836; H04L 12/1877; H04L 12/189; H04L 67/16; H04L 69/32; H04L 5/0032; H04L 5/0073; H04L 27/3488; H04L 65/60; H04L 65/607; H04Q 7/20; H04J 3/06; H04J 11/0056
See application file for complete search history.

(56) References Cited

U.S. PATENT DOCUMENTS

| | | | |
|---|---|---|---|
| 2011/0002265 A1* | 1/2011 | Chen | H04L 12/1836 370/328 |
| 2012/0236776 A1* | 9/2012 | Zhang | H04W 48/12 370/312 |
| 2014/0059618 A1* | 2/2014 | Wei | H04N 21/6131 725/62 |
| 2014/0112236 A1* | 4/2014 | Jung | H04W 36/0007 370/312 |
| 2015/0050889 A1* | 2/2015 | Axmon | H04W 24/08 455/67.11 |
| 2015/0189336 A1* | 7/2015 | Wang | H04N 21/2225 725/62 |
| 2015/0326360 A1* | 11/2015 | Malladi | H04L 5/0032 370/329 |
| 2015/0358940 A1* | 12/2015 | Zhang | H04W 4/06 370/312 |

OTHER PUBLICATIONS

Ericsson "Stage 2 Documentation of Agreements reached during the Study Item Phase" 3GPP Draft; R3-140342, 3rd Generation Partnership Project (3GPP), vol. RAN WG3 no. Prague, Czech Republic; Feb. 10, 2014-Feb. 14, 2014 Feb. 1, 2014, XP050755832.

* cited by examiner

METHOD AND APPARATUS FOR ENHANCING BROADCAST SERVICE

RELATED APPLICATION

This application was originally filed as Patent Cooperation Treaty Application No. PCT/EP2014/066707 filed Aug. 4, 2014.

BACKGROUND

Field

Embodiments of the invention relate to enhancing broadcast services (to enhance, for example, Multimedia-Broadcast-Multicast Service (MBMS)).

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may comprise receiving, by a first network node, an indication for support for a broadcast service enhancement layer from a second network node. The method may also comprise transmitting, by the first network node, the indication for support for the broadcast service enhancement layer to a third network node. The method may also comprise receiving, by the first network node, a broadcast service session request message from the third network node. The broadcast service session request message may indicate that a broadcast service session is for a base layer or for the enhancement layer.

In the method of the first embodiment, the first network node may comprise a master evolved Node B, the second network node may comprise a secondary evolved Node B, and the third network node may comprise a multimedia-broadcast-multicast-service-coordination entity.

In the method of the first embodiment, the method may further comprise transmitting the broadcast service session request message to the second network node, if the received broadcast service session request message indicates that the broadcast service session is for the enhancement layer.

In the method of the first embodiment, the broadcast service enhancement layer may be a multimedia-broadcast-multicast service enhancement layer.

In the method of the first embodiment, the method may further comprise determining a resource allocation for the session for the enhancement layer. The method may further comprise transmitting, by the first network node, the resource allocation to the second network node.

In the method of the first embodiment, the method may further comprise providing an indication to a user equipment so that the user equipment can decode the broadcast service data that is transmitted via the second network node.

In the method of the first embodiment, the first network node may be on a coverage-oriented frequency layer, and the second network node may be on a capacity-oriented frequency layer.

In the method of the first embodiment, a broadcast service related to the base layer may be provided by the first network node to the user equipment.

According to a second embodiment, an apparatus may comprise first receiving means for receiving an indication for support for a broadcast service enhancement layer from a first network node. The apparatus may also comprise first transmitting means for transmitting the indication for support for the broadcast service enhancement layer to a second network node. The apparatus may also comprise second receiving means for receiving a broadcast service session request message from the second network node, wherein the broadcast service session request message may indicate that a broadcast service session is for a base layer or for the enhancement layer.

In the apparatus of the second embodiment, the apparatus may comprise a master evolved Node B, the first network node may comprise a secondary evolved Node B, and the second network node may comprise a multimedia-broadcast-multicast-service-coordination entity.

In the apparatus of the second embodiment, the apparatus may further comprise second transmitting means for transmitting the broadcast service session request message to the first network node, if the received broadcast service session request message indicates that the broadcast service session is for the enhancement layer.

In the apparatus of the second embodiment, the broadcast service enhancement layer may be a multimedia-broadcast-multicast service enhancement layer.

In the apparatus of the second embodiment, the apparatus may further comprise determining means for determining a resource allocation for the session for the enhancement layer. The apparatus may further comprise third transmitting means for transmitting the resource allocation to the first network node.

In the apparatus of the second embodiment, the apparatus may further comprise providing means for providing an indication to a user equipment so that the user equipment may decode the broadcast service data that is transmitted via the first network node.

In the apparatus of the second embodiment, the apparatus may be on a coverage-oriented frequency layer, and the first network node may be on a capacity-oriented frequency layer.

In the apparatus of the second embodiment, a broadcast service related to the base layer may be provided by the apparatus to the user equipment.

According to a third embodiment, a computer program product may be embodied on a non-transitory computer readable medium, the computer program product may be configured to control a processor to perform a process according to a method of the first embodiment.

According to a fourth embodiment, a method may comprise transmitting, by a first network node, an indication for support for a broadcast service enhancement layer to a second network node. The method may also comprise receiving, by the first network node, a broadcast service session request message from the second network node, wherein the received broadcast service session request message may indicate that a broadcast service session is for the enhancement layer.

In the method of the fourth embodiment, the first network node may comprise a secondary evolved Node B, and the second network node may comprise a master evolved Node B.

In the method of the fourth embodiment, the method may further comprise transmitting broadcast service data for an enhancement layer to a user equipment.

In the method of the fourth embodiment, the method may further comprise receiving a resource allocation for the enhancement layer.

According to a fifth embodiment, an apparatus may comprise first transmitting means for transmitting an indication for support for a broadcast service enhancement layer to a first network node. The apparatus may also comprise first receiving means for receiving a broadcast service session request message from the first network node. The received broadcast service session request message may indicate that a broadcast service session is for the enhancement layer.

In the apparatus of the fifth embodiment, the apparatus may comprise a secondary evolved Node B, and the first network node may comprise a master evolved Node B.

In the apparatus of the fifth embodiment, the apparatus may also comprise second transmitting means for transmitting broadcast service data for an enhancement layer to a user equipment.

In the apparatus of the fifth embodiment, the apparatus may also comprise a second receiving means receives a resource allocation for the enhancement layer.

According to a sixth embodiment, a computer program product may be embodied on a non-transitory computer readable medium. The computer program product may be configured to control a processor to perform a process according to a method of the fourth embodiment.

According to a seventh embodiment, a method may comprise receiving, by a first network node, an indication for support for a broadcast service enhancement layer from a second network node. The method may also comprise receiving, by the first network node, a first broadcast service session request message, the first broadcast service session request message may indicate that a broadcast service session is for a base layer or for an enhancement layer. The method may also comprise transmitting, by the first network node, a second broadcast service session request message to the second network node. The second broadcast service session request message may indicate that a broadcast service session is for the base layer or for the enhancement layer.

In the method of the seventh embodiment, the method may further comprise determining, by the first network node, if the broadcast service enhancement layer is to be used. The method may further comprise allocating resources for the session for the broadcast service enhancement layer.

In the method of the seventh embodiment, the first network node may comprise a broadcast service coordination entity.

In the method of the seventh embodiment, the method may further comprise transmitting instructions for the allocation of the resources.

According to an eighth embodiment, an apparatus may comprise first receiving means for receiving an indication for support for a broadcast service enhancement layer from a first network node. The apparatus may also comprise second receiving means for receiving a first broadcast service session request message. The first broadcast service session request message may indicate that a broadcast service session is for a base layer or for an enhancement layer. The apparatus may also comprise first transmitting means for transmitting a second broadcast service session request message to the first network node. The second broadcast service session request message may indicate that a broadcast service session is for the base layer or for the enhancement layer.

In the apparatus of the eighth embodiment, the apparatus may further comprise determining means for determining if the broadcast service enhancement layer is to be used. The apparatus may further comprise allocating means for allocating resources for the session for the broadcast service enhancement layer.

In the apparatus of the eighth embodiment, the apparatus may comprise a broadcast service coordination entity.

In the apparatus of the eighth embodiment, the method may also comprise second transmitting means for transmitting instructions for the allocation of the resources.

According to a ninth embodiment, a computer program product may be embodied on a non-transitory computer readable medium. The computer program product may be configured to control a processor to perform a process according to a method of the seventh embodiment.

According to a tenth embodiment, a method may comprise receiving, by a first network node, a broadcast service data related to an enhancement layer from a second network node. The method may also comprise receiving, by the first network node, an indication so that the first network node can decode the broadcast service data that is transmitted via the second network node.

In the method of the tenth embodiment, the method may further comprise receiving, by the first network node, a broadcast service data related to a base layer from a third network node In the method of the tenth embodiment, the receiving the broadcast service data related to the base layer and related to the enhancement layer may comprise receiving multimedia-broadcast-multicast-service data.

In the method of the tenth embodiment, the third network node may be on a coverage-oriented frequency layer. The second network node may be on a capacity-oriented frequency layer.

In the method of the tenth embodiment, the indication may be received from the second network node or the third network node.

In the method of the tenth embodiment, the first network node may comprise a user equipment.

According to an eleventh embodiment, an apparatus may comprise first receiving means for receiving a broadcast service data related to an enhancement layer from a first network node. The apparatus may also comprise second receiving means for receiving an indication so that the apparatus can decode the broadcast service data that is transmitted via the first network node.

In the apparatus of the eleventh embodiment, the apparatus may further comprise third receiving means for receiving a broadcast service data related to a base layer from a second network node.

In the apparatus of the eleventh embodiment, the receiving the broadcast service data related to the base layer and related to the enhancement layer may comprise receiving multimedia-broadcast-multicast-service data.

In the apparatus of the eleventh embodiment, the second network node may be on a coverage-oriented frequency layer. The first network node may be on a capacity-oriented frequency layer.

In the apparatus of the eleventh embodiment, the indication may be received from the first network node or the second network node.

In the apparatus of the eleventh embodiment, the apparatus may be a user equipment.

According to a twelfth embodiment, a computer program product may be embodied on a non-transitory computer readable medium. The computer program product may be configured to control a processor to perform a process according to a method of the tenth embodiment.

According to a thirteenth embodiment, an apparatus may include at least one processor. The apparatus may also include at least one memory including computer program code. The at least one memory and the computer program code may be configured, with the at least one processor, to cause the apparatus at least to receive an indication for support for a broadcast service enhancement layer from a first network node. The apparatus may also be caused to transmit the indication for support for the broadcast service enhancement layer to a second network node. The apparatus may also be caused to receive a broadcast service session request message from the second network node. The broadcast service session request message may indicate that a broadcast service session is for a base layer or for the enhancement layer.

According to a fourteenth embodiment, an apparatus may include at least one processor. The apparatus may also include at least one memory including computer program code. The at least one memory and the computer program code may be configured, with the at least one processor, to cause the apparatus at least to transmit an indication for support for a broadcast service enhancement layer to a first network node. The apparatus may also be caused to receive a broadcast service session request message from the first network node, wherein the received broadcast service session request message may indicate that a broadcast service session is for the enhancement layer.

According to a fifteenth embodiment, an apparatus may include at least one processor. The apparatus may also include at least one memory including computer program code. The at least one memory and the computer program code may be configured, with the at least one processor, to cause the apparatus at least to receive an indication for support for a broadcast service enhancement layer from a first network node. The apparatus may also be caused to receive a first broadcast service session request message, the first broadcast service session request message indicates that a broadcast service session is for a base layer or for an enhancement layer. The apparatus may also be caused to transmit a second broadcast service session request message to the first network node. The second broadcast service session request message may indicate that a broadcast service session is for the base layer or for the enhancement layer.

According to a sixteenth embodiment, an apparatus may include at least one processor. The apparatus may also include at least one memory including computer program code. The at least one memory and the computer program code may be configured, with the at least one processor, to cause the apparatus at least to receive a broadcast service data related to an enhancement layer from a first network node. The apparatus may also be caused to receive an indication so that the apparatus can decode the broadcast service data that is transmitted via the first network node.

According to a seventeenth embodiment, a system may comprise a first apparatus. The first apparatus may comprise first receiving means for receiving an indication for support for a broadcast service enhancement layer from a second apparatus. The first apparatus may also comprise first transmitting means for transmitting the indication for support for the broadcast service enhancement layer to a third apparatus. The first apparatus may also comprise second receiving means for receiving a broadcast service session request message from the third apparatus. The broadcast service session request message may indicate that a broadcast service session is for a base layer or for the enhancement layer. The system may also comprise a second apparatus. The second apparatus may also comprise second transmitting means for transmitting the indication for support for the broadcast service enhancement layer to the first apparatus. The second apparatus may also comprise third receiving means for receiving the broadcast service session request message from the first apparatus. The received broadcast service session request message may indicate that a broadcast service session is for the enhancement layer. The system may also comprise a third apparatus. The third apparatus may also comprise fourth receiving means for receiving the indication for support for a broadcast service enhancement layer from the first apparatus. The third apparatus may also comprise fifth receiving means for receiving a first broadcast service session request message. The first broadcast service session request message may indicate that the broadcast service session is for the base layer or for the enhancement layer. The third apparatus may also comprise third transmitting means for transmitting a second broadcast service session request message to the first apparatus. The second broadcast service session request message may indicate that a broadcast service session is for the base layer or for the enhancement layer. The system may also comprise a fourth apparatus. The fourth apparatus may comprise sixth receiving means for receiving the broadcast service data related to the enhancement layer from the second apparatus. The fourth apparatus may also comprise seventh receiving means for receiving an indication so that the apparatus can decode the broadcast service data that is transmitted via the first network node.

BRIEF DESCRIPTION OF THE DRAWINGS

For proper understanding of the invention, reference should be made to the accompanying drawings, wherein.

DETAILED DESCRIPTION

Embodiments of the present invention are directed to enhancing broadcast service, such as, for example, Multimedia-Broadcast-Multicast Service (MBMS). Embodiments of the present invention can enhance, for example, a small-cell system. Although certain embodiments are directed to enhancing MBMS service, other embodiments are applicable to other types of broadcast service. MBMS service may be defined as a point-to-multipoint service in which data is transmitted from a single source entity to multiple recipients. Transmitting the same data to multiple recipients allows network resources to be shared. A cell may be able to belong to one or more MBMS Service Areas (SAs), and, therefore, the cell may be configured with one or more MBMS Service Area Identities (SAIs). Each MBMS session may have an associated service area. An MBMS session may have a corresponding MBMS session control signaling that is sent to all evolved Node Bs (eNBs) that belong to the service areas of the MBMS session.

Figure 1:
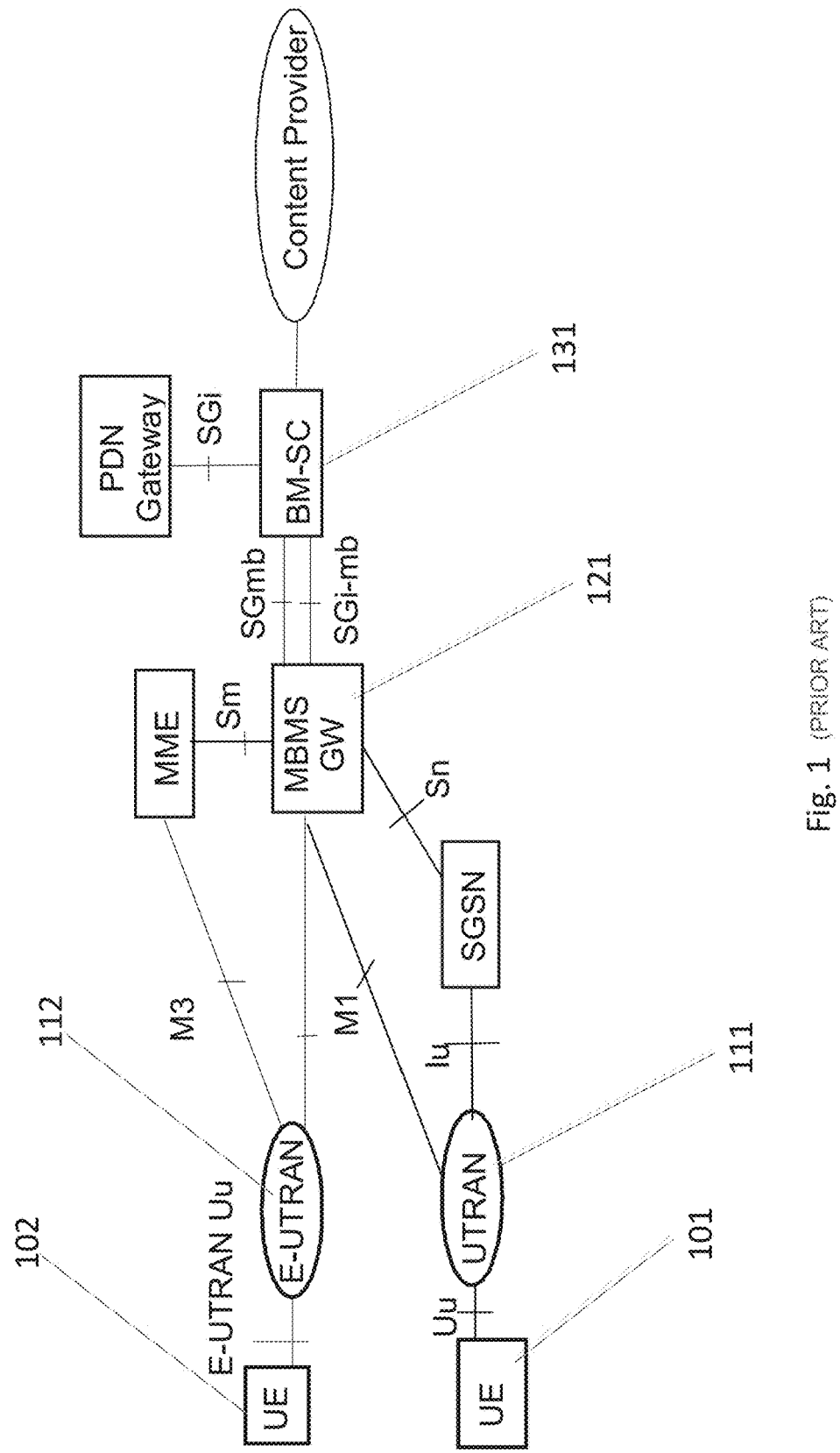
FIG. 1 illustrates an example MBMS architecture.

FIG. 1 illustrates an example MBMS architecture. MBMS for Evolved-Packet-System (EPS) supports Enhanced UTRAN (EUTRAN) 112 and UTRAN 111. In the EPS, a functional entity corresponding to a Multimedia-Broadcast-Multicast-Services Gateway (MBMS GW) 121 exists at the edge between the Core Network (CN) and a Broadcast-Multicast-Service-Center (BM-SC) 131. In the bearer plane, this service provides delivery of IP Multicast datagrams from the Gi and Sgi-mb reference points to UEs (101, 102) with a specified Quality of Service. An MBMS service may be able to operate with the granularity of a Enhanced UTRAN (EUTRAN) cell. In this case, an MBMS transmission in the cell does not need to be synchronized with other cells.

Figure 2:
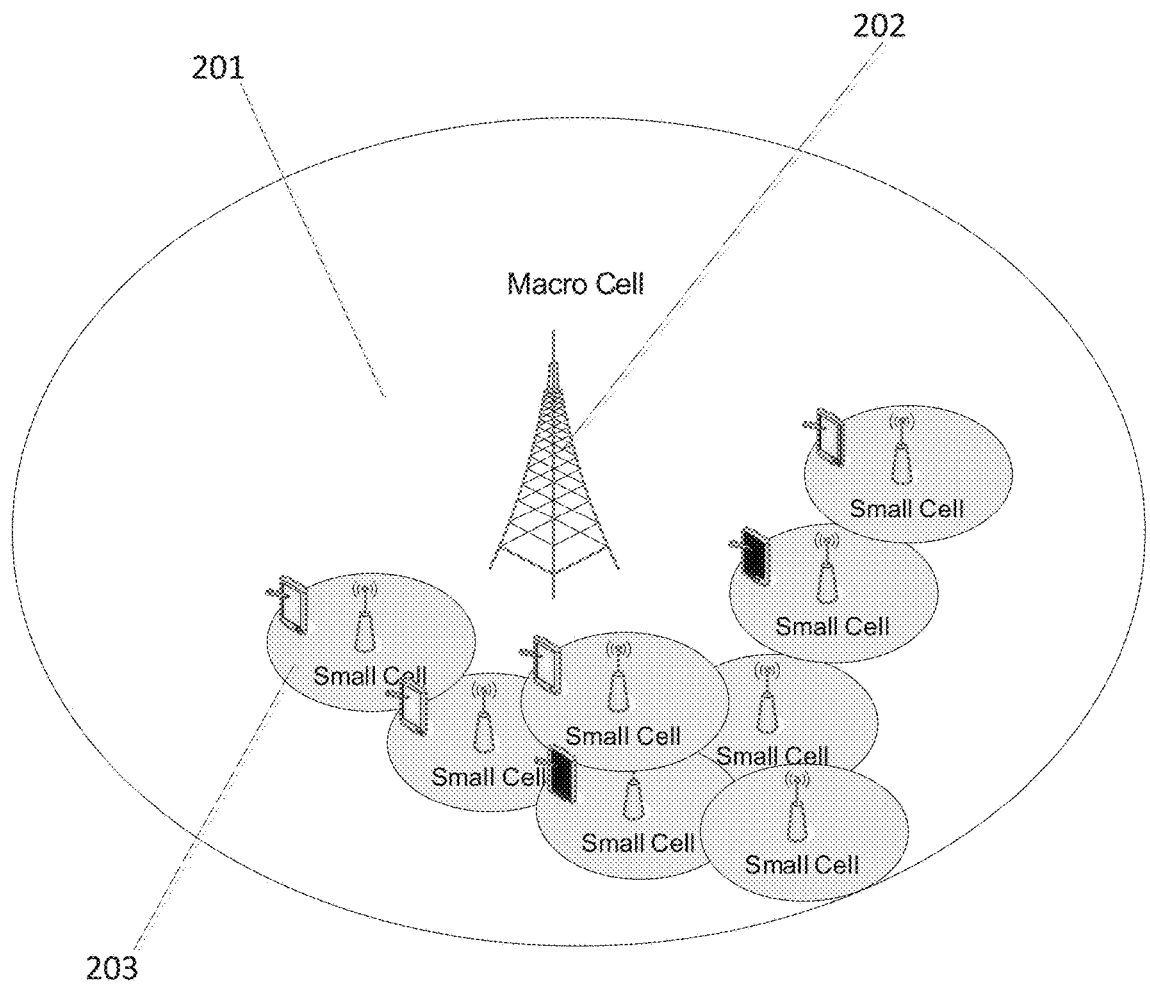
FIG. 2 illustrates an example deployment scenario for a small cell system.

FIG. 2 illustrates an example deployment scenario for a small cell system. With regard to Dual Connectivity for LTE, Dual Connectivity for LTE is currently being developed. Small cells 203 may be used as low power nodes that boost a capacity of an already-deployed cellular network. 3GPP Release-12 addresses the scenario where macro cells 201 and small cells 203 are on different carrier frequencies (an inter-frequency scenario).

From a deployment perspective, an operator may upgrade a macro eNB 202 to be a Master-evolved-Node-B (MeNB) to ensure the coverage, and to deploy lower power nodes (such as SeNBs, for example) to provide capacity enhancement.

Figure 3:
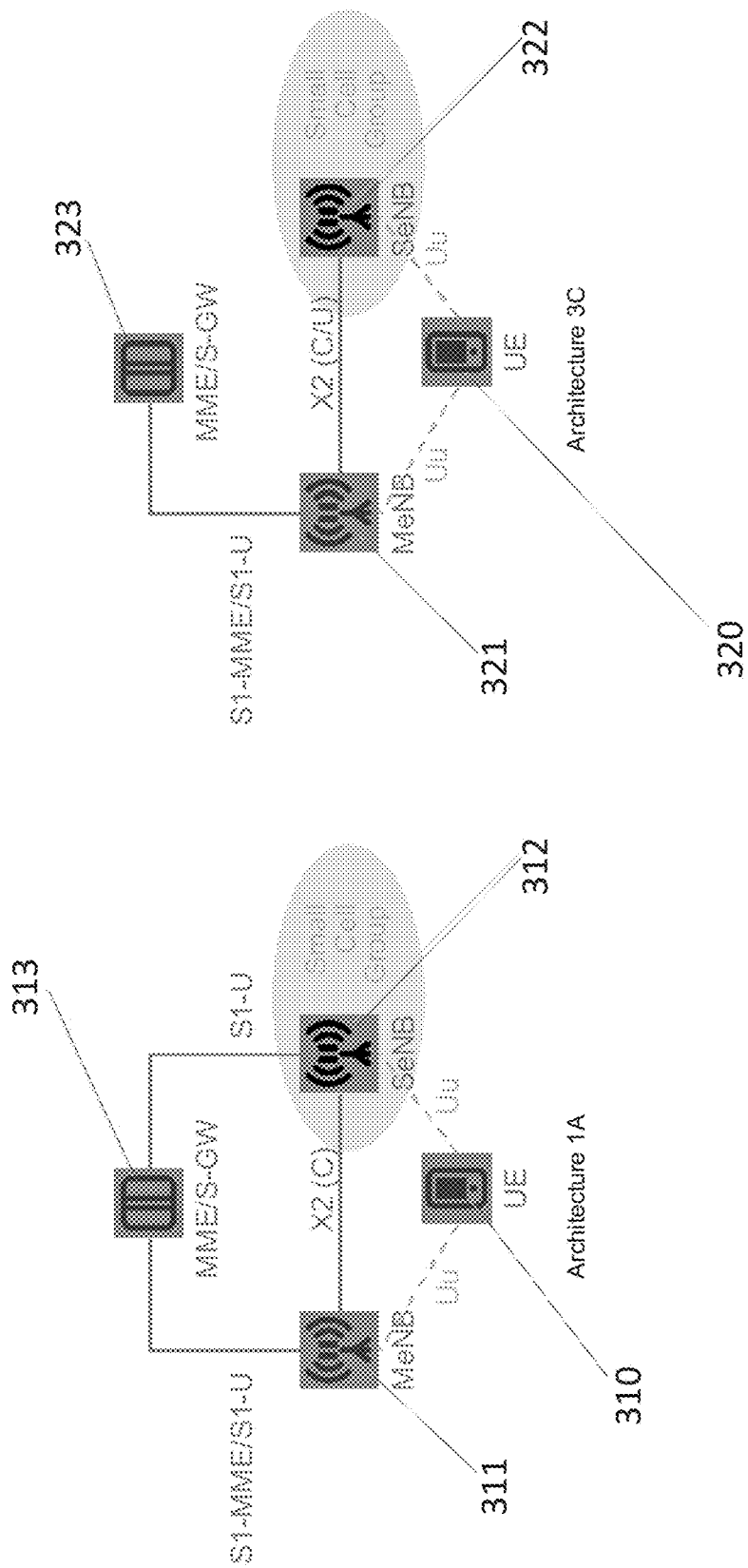
FIG. 3 illustrates an example Dual Connectivity Architecture.

FIG. 3 illustrates an example Dual Connectivity Architecture. Dual Connectivity refers to an operation where a given UE (310, 320) consumes radio resources that are provided by at least two different network points ((311, 312) and (321, 322)). The two different network points are connected with a non-ideal backhaul, i.e., a backhaul connection with non-negligible constraints on throughput and/ or delay. Dual-Connectivity may provide the following benefits: (1) throughput enhancements with inter-eNB Carrier Aggregation, (2) traffic offload to small cells, and (3) macro cells may be relieved from processing of all user plane data.

In dual connectivity, there may be three types of bearers: Master Cell Group (MCG) bearers, split bearers, and Secondary Cell Group (SCG) bearers. For MCG bearers (not shown), a Master-evolved-Node-B (MeNB) is U-plane connected to a Serving Gateway (S-GW) via S1-U, and Secondary eNBs (SeNBs) are not involved in the transport of user plane data.

For split bearers (FIG. 3, Architecture 3C), the MeNB is U-plane connected to the S-GW 323 via S1-U. In addition, the MeNB and the SeNB are interconnected via X2-U. For SCG bearers (FIG. 3, Architecture 1A), the SeNB is directly connected with the S-GW 313 via S1-U.

Scalable Video Coding (SVC) is a video compression standard. SVC standardizes the encoding of a high-quality video bitstream that also contains one or more subset bitstreams. A subset video bitstream is derived by dropping packets from the larger video to reduce the bandwidth required for the subset bitstream. The subset bitstream can represent a lower spatial resolution (smaller screen), lower temporal resolution (lower frame rate), or lower quality video signal. SVC allows on-the-fly adaptation to certain application requirements such as display and processing capabilities of target devices, and varying transmission conditions. For example, an application content (such as, for example, high-quality video) may be encoded into two subset bitstreams that use SVC.

A Base layer may be used by UEs with small displays (Quarter-Common-Intermediate-Format/Quarter-Video-Graphics-Array (QCIF/QVGA)), low processing power, and low data-rate connection. These UE do not need to decode the bitstreams for an enhancement layer. Enhancement layers may be used by UEs with large displays (CIFNGA), high-processing power, and high data-rate connection. A UE may decode the bitstreams for both Base layer and Enhancement layer for a better user experience.

Therefore, when using MBMS to transmit an application content using SVC, the base layer and the enhancement layer may be transmitted via different MBMS sessions to allow the UEs to selectively receive the needed bitstreams.

Because a macro eNB will generally provide the coverage, providing MBMS service via the macro eNB may be generally straightforward. However, the macro eNB may not have enough resources to support many MBMS sessions, especially when more and more MBMS sessions are used to transmit high-quality video content. Current Dual Connectivity is designed to enhance the capacity for unicast service. The SCG addition procedure may be related to a specific UE's Evolved Packet System (EPS) bearer.

The previous approaches generally describe transmitting MBMS data with carrier aggregation. However, the previous approaches do not discuss how to support the transmission of different resolutions of MBMS data via different eNBs, and the previous approaches do not discuss how a core network works together with multiple eNBs.

Embodiments of the present invention are directed to a method for enhancing MBMS for dual-connectivity-enabled UE. Embodiments of the present invention enhance MBMS by broadcasting a base layer for a service by at least one base station on a coverage-oriented frequency layer. Embodiments of the present invention also broadcast an enhancement layer for the same service, by at least one base station on a capacity-oriented frequency layer. The coverage of the capacity-oriented frequency layer may be the same as or a subset of the coverage of the coverage-oriented frequency layer.

According to embodiments of the present invention, the base station on the capacity-oriented frequency layer (such as the SeNB, for example) indicates the support for an enhancement layer of MBMS service to the base station on the coverage-oriented frequency layer (to the MeNB, for example). The base station on the coverage-oriented frequency layer (e.g., the MeNB) may inform MCE about the support for enhancement layer of MBMS service.

The Core Network (CN) may indicate whether the MBMS session is for a base layer or for an enhancement layer. The MCE may perform resource allocation for the base layer. The base station on the coverage-oriented frequency layer (e.g., the MeNB) may inform the base station on the capacity-oriented frequency layer (e.g., the SeNB) about the resource allocation for the enhancement layer to be transmitted via MBMS.

For the base layer, the MBMS Session start procedure may be terminated at the base station on the coverage-oriented frequency layer (e.g., the MeNB). This base station may transmit the MBMS data related to the base layer.

For the enhancement layer, the MBMS session start procedure may be terminated at the base station on the capacity-oriented frequency layer (e.g., the SeNB). This base station may transmit the MBMS data related to the enhancement layer. Alternatively, both (the MBMS session start procedure and the MBMS data for the base and the enhancement layer) may be terminated at the base station on the coverage-oriented frequency layer (e.g., the MeNB), and the MBMS session start procedure and the MBMS data related to the enhancement layer may be forwarded to the base station on the capacity-oriented frequency layer (e.g., the SeNB).

In certain embodiments of the present invention, the base station on the coverage-oriented frequency layer (e.g., the MeNB) may provide an indication so that the UE can decode the MBMS data transmitted via the base station on the capacity-oriented frequency layer (e.g., the SeNBs).

In certain embodiments of the present invention, the UE may receive the MBMS data that is related to the base layer from the base station on the coverage-oriented frequency layer (e.g., the MeNB), and the MBMS data related to the enhancement layer from the base station on the capacity-oriented frequency layer (e.g., the SeNB).

Embodiments of the present invention may enhance the capacity of MBMS with dual connectivity. The basic MBMS service may be guaranteed via the base station on the coverage-oriented frequency layer (e.g., the MeNB). The enhanced MBMS service may be boosted via the base station on the capacity-oriented frequency layer (e.g., the SeNB).

A Dual-Connectivity UE may receive the MBMS session for the base layer from the MeNB, and the MBMS session for the enhancement layers from the SeNBs. Legacy UEs may be not affected, because the legacy UEs continue to receive the MBMS session for the base layer from the MeNB. The MeNB and the SeNB may dynamically control the MBMS-related data and may increase the total throughput. For example, if the SeNB observes high unicast load, it may request to shift the broadcasting of the enhancement layer back to the MeNB. By so doing, if the unicast load in the MeNB is not high, the total served unicast throughput is increased.

Figure 4:
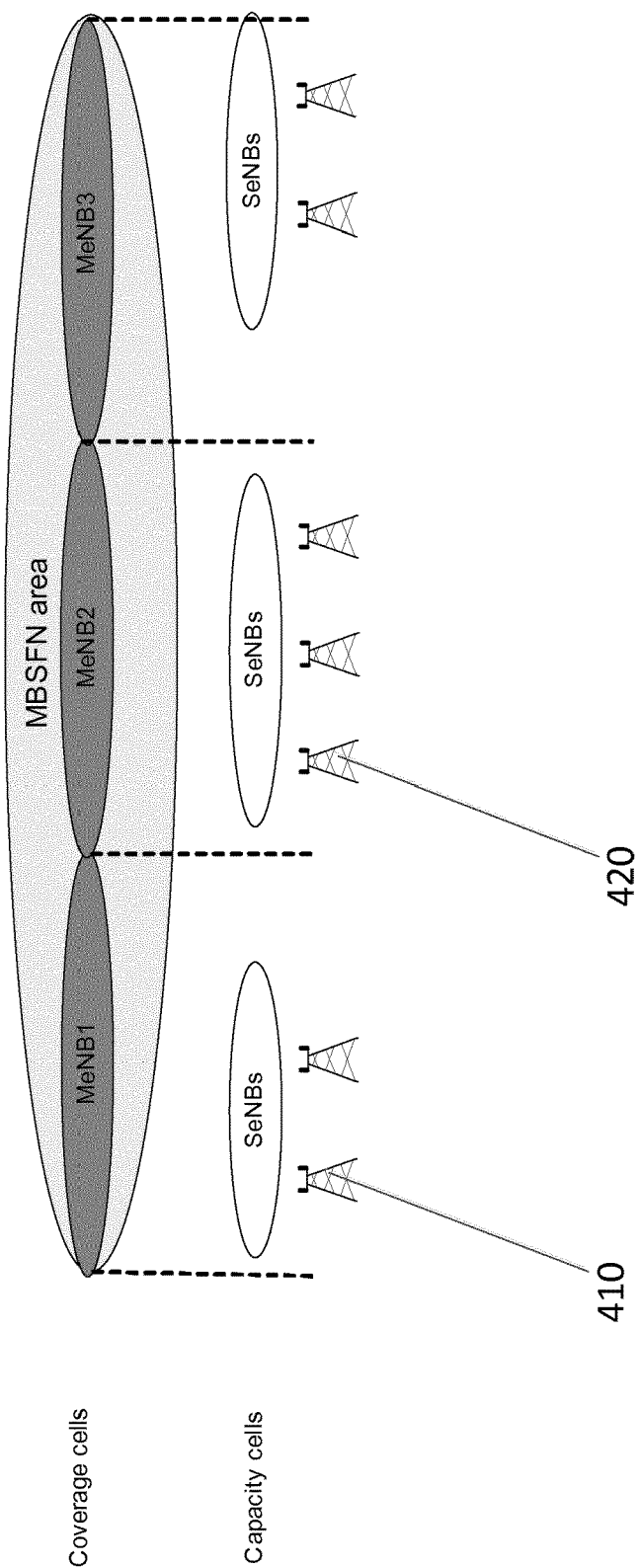
FIG. 4 illustrates the first usage scenario in accordance with one embodiment.

With respect to specific usage scenarios, there are at least two possible scenarios. With a first scenario, the coverage of Small Cells are not continuous. FIG. 4 illustrates the first usage scenario in accordance with one embodiment. With this first scenario, the MBMS data transmission for SeNBs (410, 420) belonging to different MeNBs may not need to be synchronized. Each MeNB can decide the MBMS transmission for its SeNBs. This may be considered to be a single eNB (i.e., MeNB) MBSFN transmission controlled by the MeNB.

Figure 5:
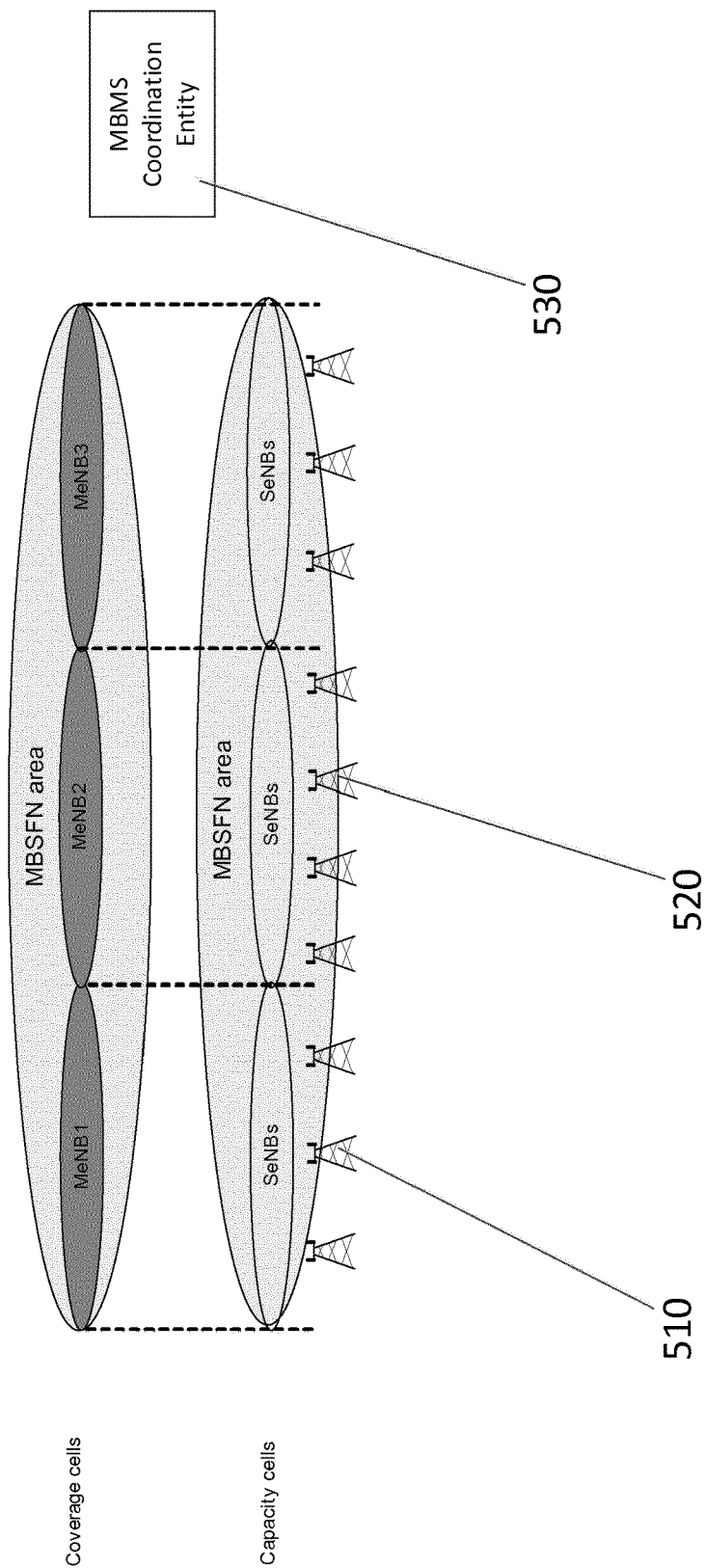
FIG. 5 illustrates a second usage scenario in accordance with one embodiment.

With a second scenario, the coverage of Small Cells are continuous. FIG. 5 illustrates a second usage scenario in accordance with one embodiment. With this second scenario, it may be possible to enable MBSFN transmission in SeNBs (510, 520) belonging to different MeNBs. An MBMS Coordination Entity (MCE) 530 decides the MBMS transmission for the SeNBs. Depending on the deployment scenario, the operator may make a corresponding configuration in the MCE.

Figure 6:
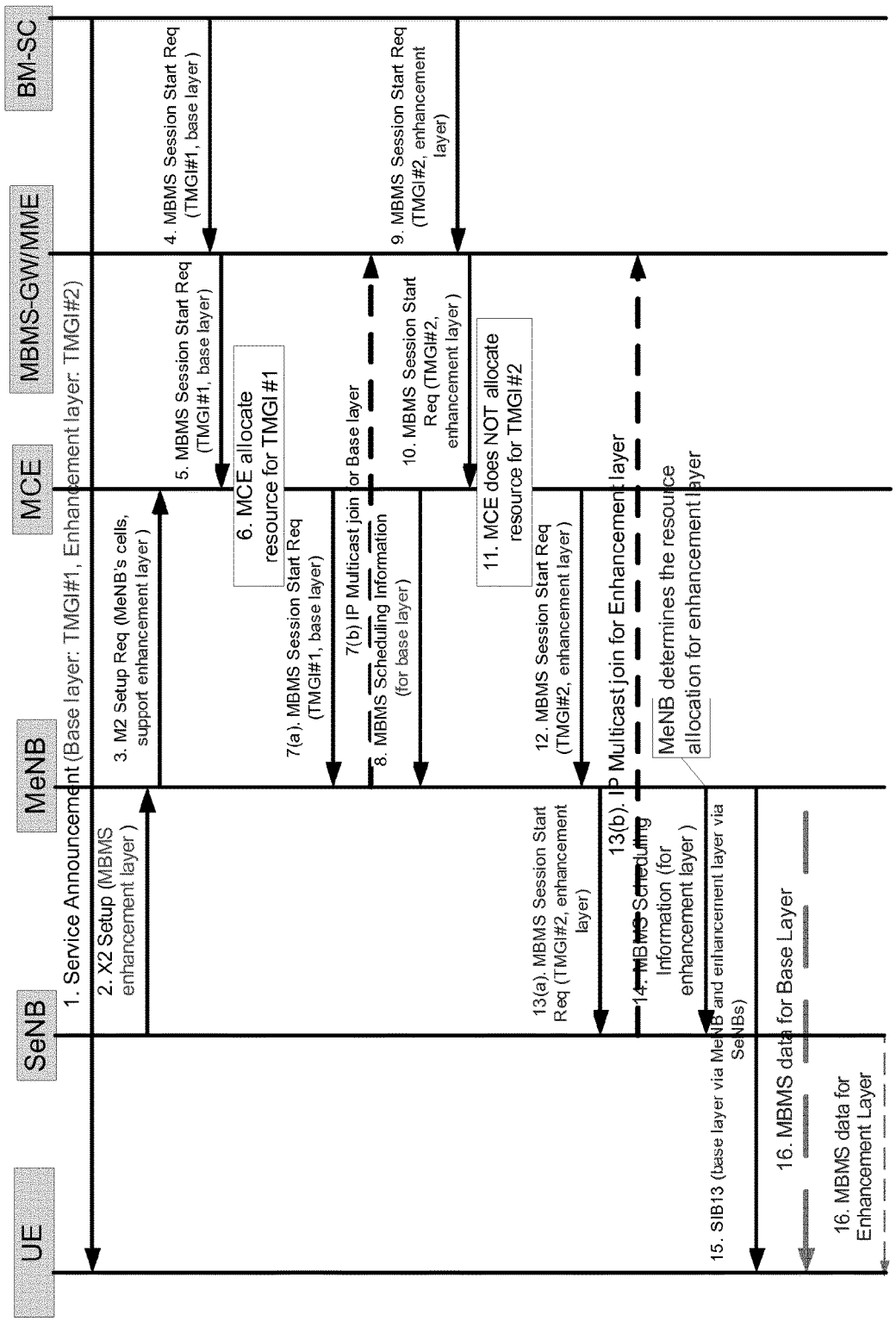
FIG. 6 illustrates an example implementation for an MBMS Session start procedure for the first scenario.

FIG. 6 illustrates an example implementation for an MBMS Session start procedure for the first scenario. One example implementation is described below. The MBMS Session Start procedure may comprise the following steps. First, a Service announcement may comprise the information for a base layer and an enhancement layer. Second, during an X2 setup procedure, an SeNB indicates support for an MBMS enhancement layer to the MeNB. The SeNB may also use other procedures to inform the MeNB. Third, during the M2 setup procedure, the MeNB indicates the support for the MBMS enhancement layer to the MCE. Fourth, the Broadcast-Multicast-Service-Center (BM-SC) initiates the MBMS Session Start procedure. The MBMS SESSION START REQUEST message indicates that the MBMS session is for the base layer. Fifth, the Core Network (CN) sends the MBMS SESSION START REQUEST message to an MBMS Coordination Entity (MCE). The message indicates that the MBMS session is for the base layer. Sixth, upon recognizing that the MBMS session is for the base layer, the MCE allocates the resource for the MBMS session. A legacy MCE may simply ignore the base layer indication, and treat the MBMS session as a normal MBMS session. Referring to step 7(a), the MCE sends the MBMS SESSION START REQUEST message to the MeNB. The message indicates that the MBMS session is for the base layer. The MBMS SESSION START REQUEST message corresponds to a broadcast service session request message that may include a content that is the same as, different from, or a subset of the content of the MBMS SESSION START REQUEST message of step 5. Referring to step 7(b), the MeNB joins the Internet Protocol (IP) multicast group for the base layer. Eighth, the MCE initiates an MBMS Scheduling information procedure. The message indicates that the resource is allocated for the base layer. Ninth, the BM-SC initiates the MBMS Session Start procedure. The MBMS SESSION START REQUEST message indicates that the MBMS session is for the enhancement layer. Tenth, the CN sends the MBMS SESSION START REQUEST message to the MCE. The message indicates that the MBMS session is for the enhancement layer. A legacy MCE may ignore the enhancement layer indication, and treat the MBMS session as a normal MBMS session. Eleventh, upon recognizing that the MBMS session is for the enhancement layer, the MCE does not allocate the resource for the MBMS session. Twelfth, the MCE sends the MBMS SESSION START REQUEST message to the MeNB. The message indicates that the MBMS session is for the enhancement layer. This MBMS SESSION START REQUEST message corresponds to a broadcast service session request message that may include a content that is the same as, different from, or a subset of the content of the MBMS SESSION START REQUEST message of step 10. Referring to step 13(a), upon recognizing that the MBMS session is for the enhancement layer, the MeNB forwards the MBMS SESSION START REQUEST message to the SeNB. Referring to step 13(b), the SeNB joins the Internet Protocol (IP) multicast group for the enhancement layer.

Alternatively, both the MBMS control signalling and the M1 interface, the interface over which MBMS user-plane data is transferred from core network to E-UTRAN (refer to, for example, FIG. 1), are terminated at the MeNB. The MeNB joins the IP multicast group for the enhancement layer. The MeNB initiates an X2 procedure to inform the SeNB, and forwards data received over the M1 interface to the SeNB. Fourteenth, the MeNB determines that the resource allocation for the enhancement layer. The MeNB sends a MBMS Scheduling Information message to the SeNB. Fifteenth, the MeNB broadcasts (for example, via System Information Block (SIB) 13) an indication so that the UE knows that the related enhancement layer is transmitted via SeNBs. Sixteenth, the UE receives the base layer from the MeNB, and the enhancement layer from the SeNB.

Figure 7:
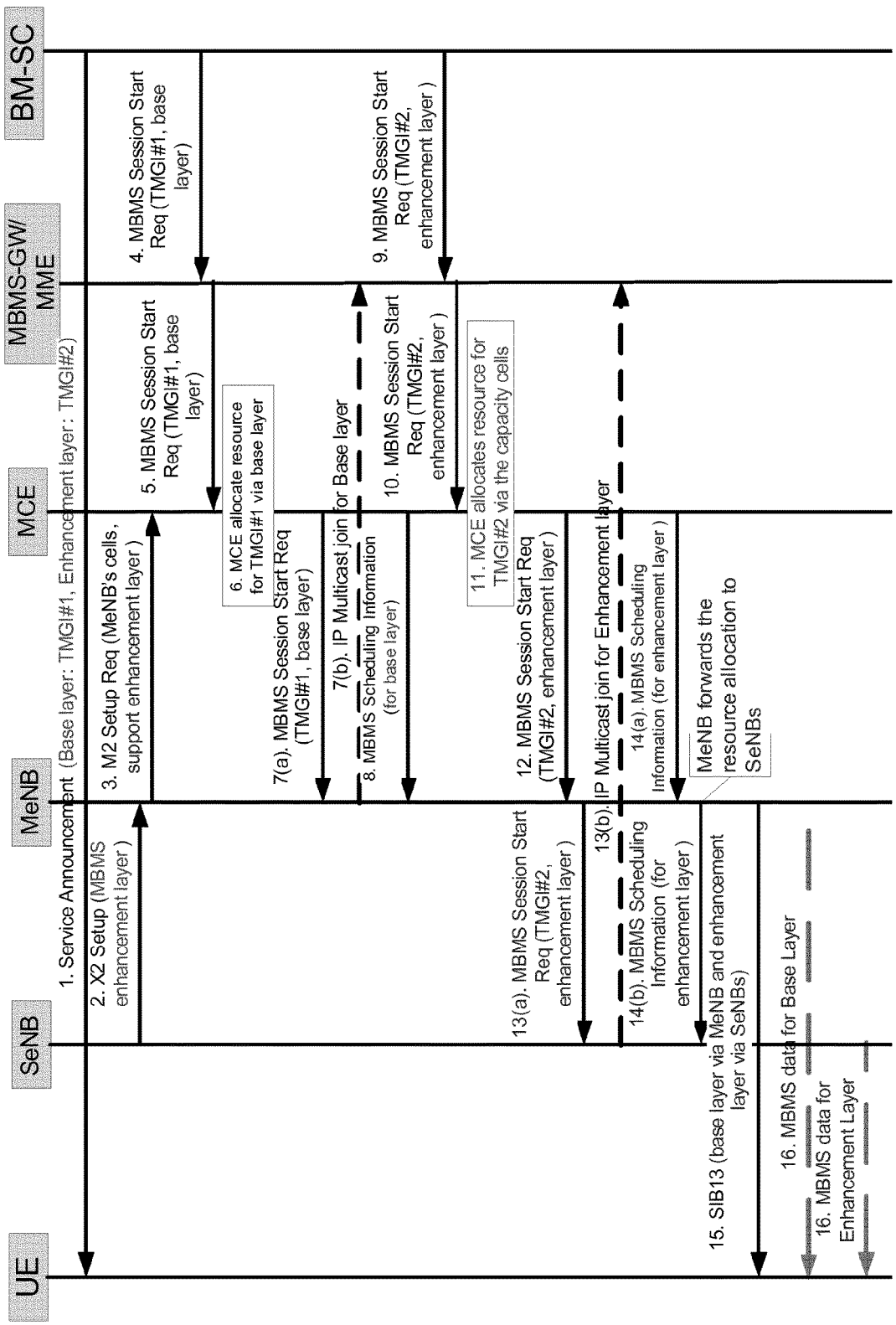
FIG. 7 illustrates an example implementation for an MBMS Session start procedure for the second scenario.

As described above, with a second scenario, the coverage of Small Cells are continuous. FIG. 7 illustrates an example implementation for an MBMS Session start procedure for the second scenario. With the second scenario, the second scenario performs steps 1-10 as described above with respect to the first scenario shown in FIG. 6. Next, eleventh, upon recognizing that the MBMS session is for the enhancement layer, the MCE allocates the resource for the MBMS session via the capacity cells, i.e., via SeNBs. The MCE may know the resource allocation for SeNBs, but it may not know the detailed information of the SeNBs. Twelfth, the procedure for the second scenario can perform a step that corresponds to the twelfth step of the first scenario. Thirteenth, the procedure for the second scenario can perform a step that corresponds to the thirteenth step of the first scenario. Referring to step 14(*a*), the MCE sends the MBMS Scheduling Information to the MeNB. The message may comprise the resource allocation for the MBMS session via the capacity cells, i.e., the SeNBs. Referring to step 14(*b*), the MeNB may forward the MBMS SCHEDULING INFORMATION to the SeNB. Fifteenth, the procedure for the second scenario can perform a step that corresponds to the fifteenth step of the first scenario. Sixteenth, the procedure for the second scenario can perform a step that corresponds to the sixteenth step of the first scenario.

In Scenario 1, the MeNB may decide to move the MBMS Session to the SeNB (as shown in FIG. 6), or may decide to move the MBMS back to MeNB (not shown in FIG. 6). This decision may occur based on the load in MeNB/SeNB, or a request from SeNB, or an operator policy, for example. An example implementation for moving the MBMS session back to MeNB is described below.

Figure 8:
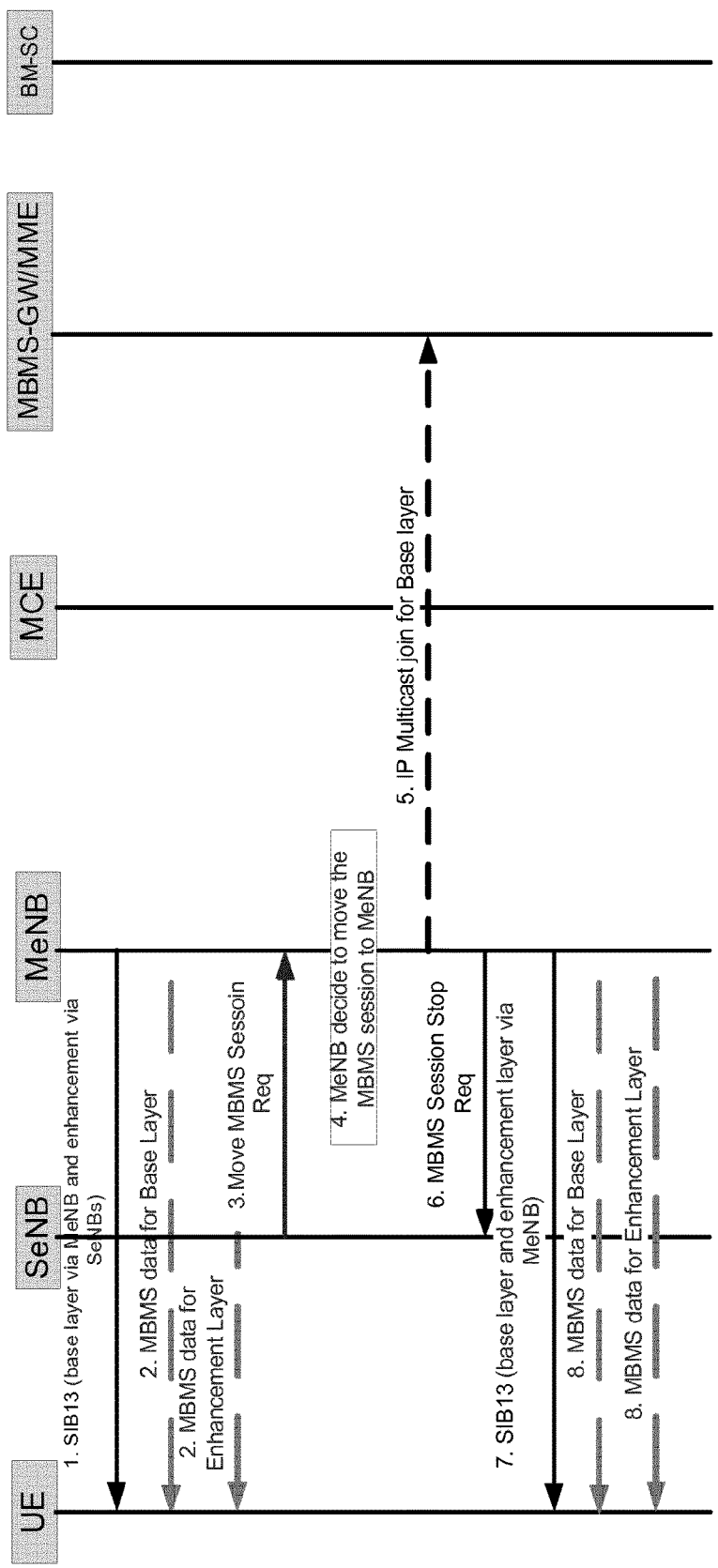
FIG. 8 illustrates an example dynamic MBMS load adjustment.

FIG. 8 illustrates an example of dynamic MBMS load adjustment. First, the MeNB indicates that the base layer is sent via MeNB, and the enhancement layer is sent via SeNBs. Second, the UE receives the base layer from the MeNB, and the UE receives the enhancement layer from the SeNB. Third, for a variety of reasons, the SeNB may request to move the MBMS session back for the enhancement layer to the MeNB. This request may occur as a result of a counting procedure by which E-UTRAN polls interest in a given MBMS service by inviting terminals interested in that service to respond. Alternatively, the MeNB may also initiate the MBMS session adjustment. In this event case, Step 3 is not needed. Fourth, The MeNB may decide to move the MBMS session related to the enhancement layer back. Fifth, the MeNB may join the IP multicast group for the enhancement layer. In case the M1 interface for receiving the user-plane data for the enhancement layer is terminated at the MeNB, this step is not needed. Sixth, the MeNB initiates the MBMS Session Stop procedure to stop the MBMS Session in SeNB. Seventh, the MeNB provides an updated indication to the UE, so that the UE knows that both base layer and enhancement layer are now sent via MeNB. Eighth, the UE receives both the base layer and the enhancement layer from the MeNB.

Figure 9:
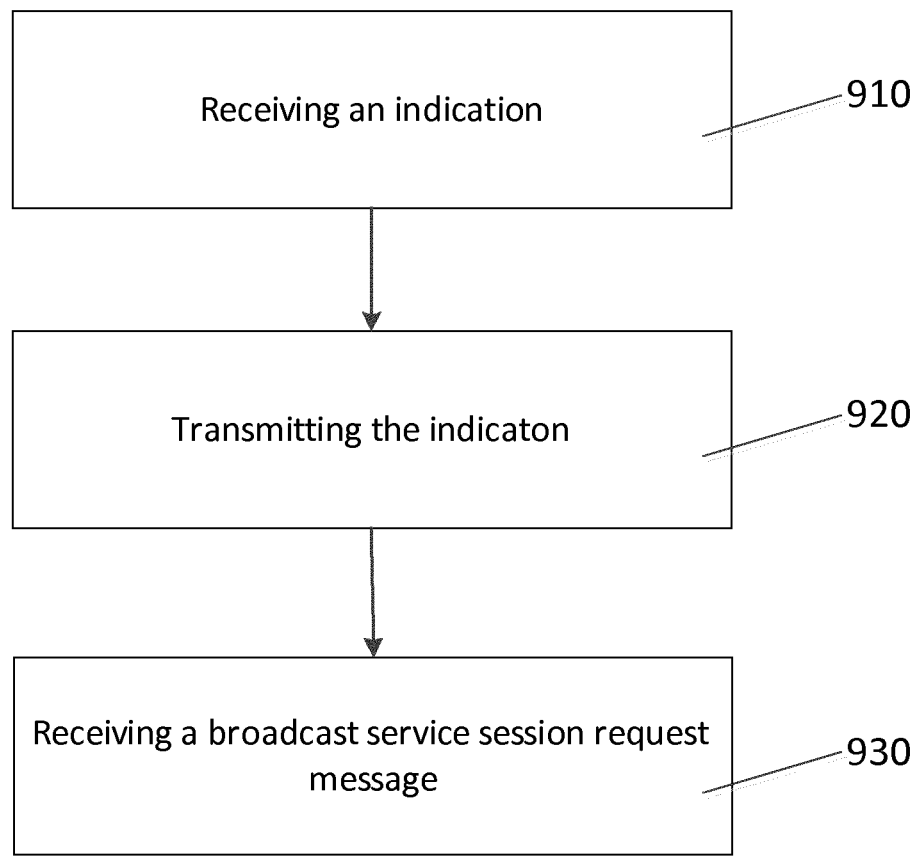
FIG. 9 illustrates a logic flow diagram of a method according to one embodiment.

FIG. 9 illustrates a logic flow diagram of a method according to certain embodiments of the invention. The method illustrated in FIG. 9 may comprise, at 910, receiving, by a first network node, an indication for support for a broadcast service (e.g., a MBMS) enhancement layer from a second network node. The method may also comprise, at 920, transmitting, by the first network node, the indication for support for the broadcast service enhancement layer to a third network node. The method may also comprise, at 930, receiving, by the first network node, a broadcast service session request message (e.g., a start request message) from the third network node. The broadcast service session request message indicates that a broadcast service session is for a base layer or for the enhancement layer.

Figure 10:
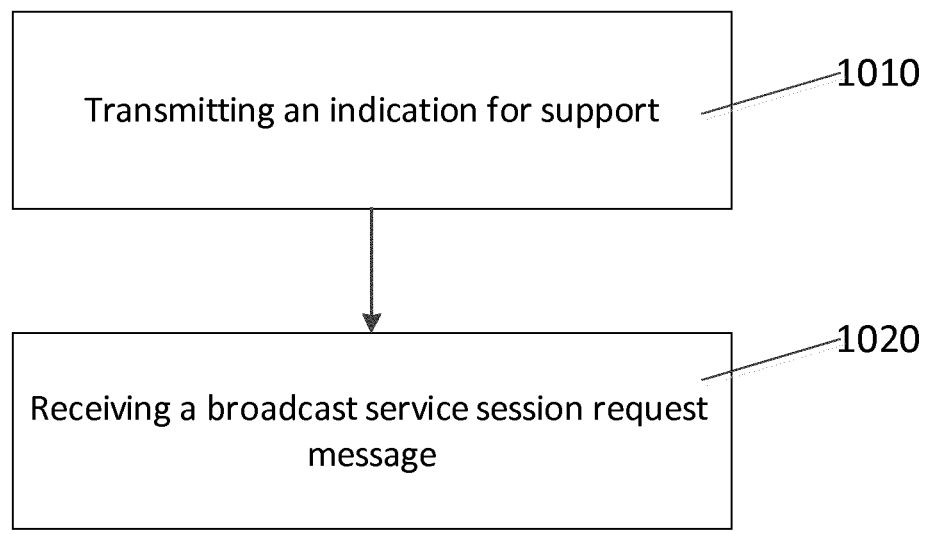
FIG. 10 illustrates a logic flow diagram of another method according to one embodiment.

FIG. 10 illustrates a logic flow diagram of a method according to certain embodiments of the invention. The method illustrated in FIG. 10 may comprise, at 1010, transmitting, by a first network node, an indication for support for a broadcast service (e.g., MBMS) enhancement layer to a second network node. The method may also comprise, at 1020, receiving, by the first network node, a broadcast service session request message (e.g., a start request message) from the second network node. The received broadcast service session request message indicates that a broadcast service session is for the enhancement layer.

Figure 11:
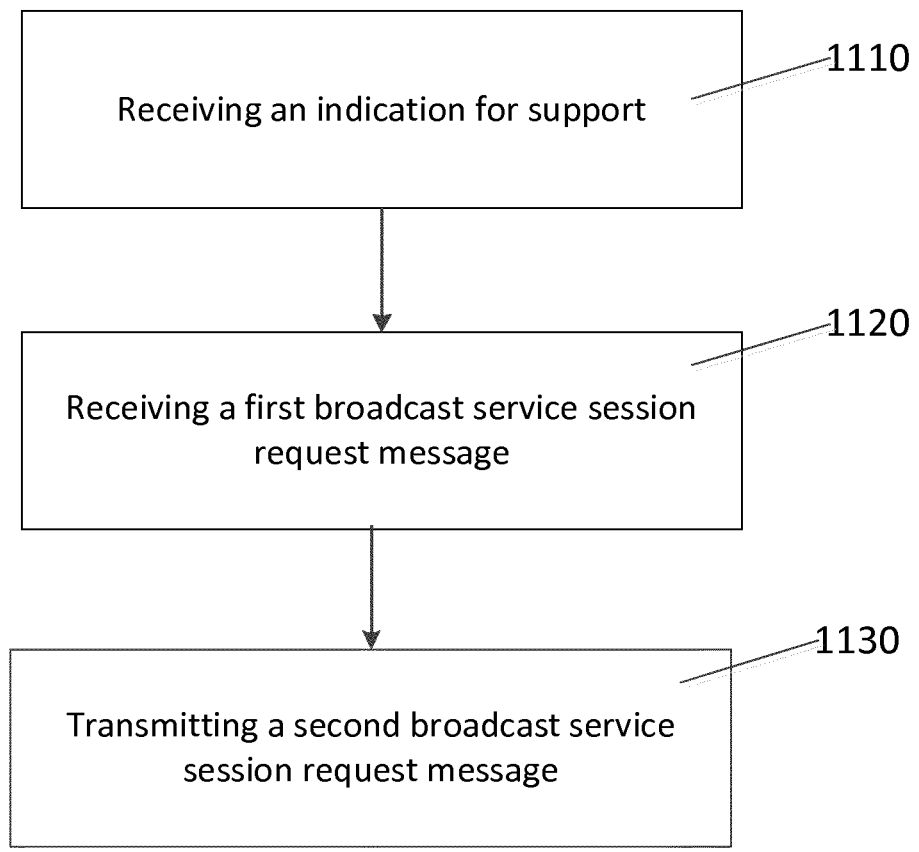
FIG. 11 illustrates a logic flow diagram of another method according to one embodiment.

FIG. 11 illustrates a logic flow diagram of a method according to certain embodiments of the invention. The method illustrated in FIG. 11 may comprise, at 1110, receiving, by the first network node, an indication for support for a broadcast service enhancement layer from a second network node. The method may also comprise, at 1120, receiving, by the first network node, a first broadcast service session request message. The first broadcast service session request message may indicate that a broadcast service session is for a base layer or for an enhancement layer. The method may also comprise, at 1130, transmitting, by the first network node, a second broadcast service session request message to the second network node. The second broadcast service session request message may indicate that a broadcast service session is for the base layer or for the enhancement layer.

Figure 12:
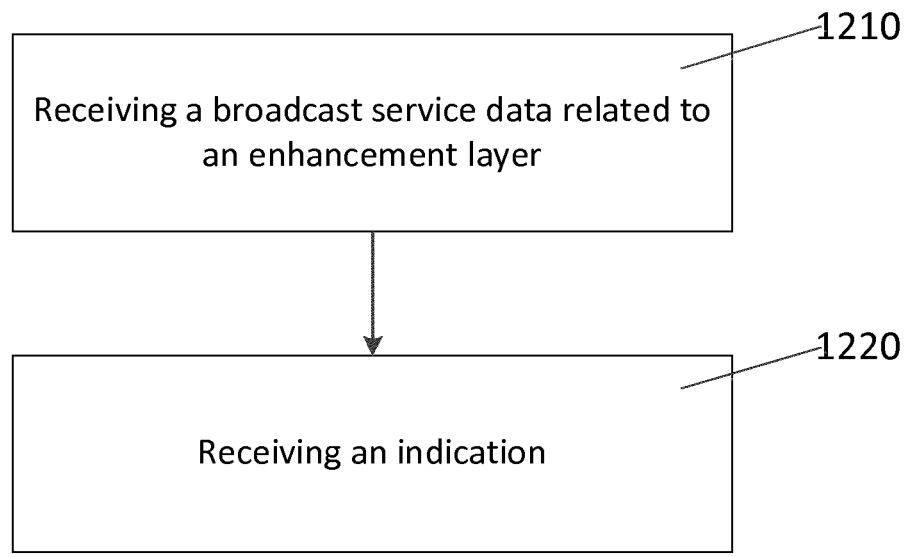
FIG. 12 illustrates a logic flow diagram of another method according to one embodiment.

FIG. 12 illustrates a logic flow diagram of a method according to certain embodiments of the invention. The method illustrated in FIG. 12 may comprise, at 1210, receiving, by a first network node, a broadcast service data related to an enhancement layer from a second network node. The method may also comprise, at 1220, receiving, by the first network node, an indication so that the first network node can decode the broadcast service data that is transmitted via the second network node.

Figure 13:
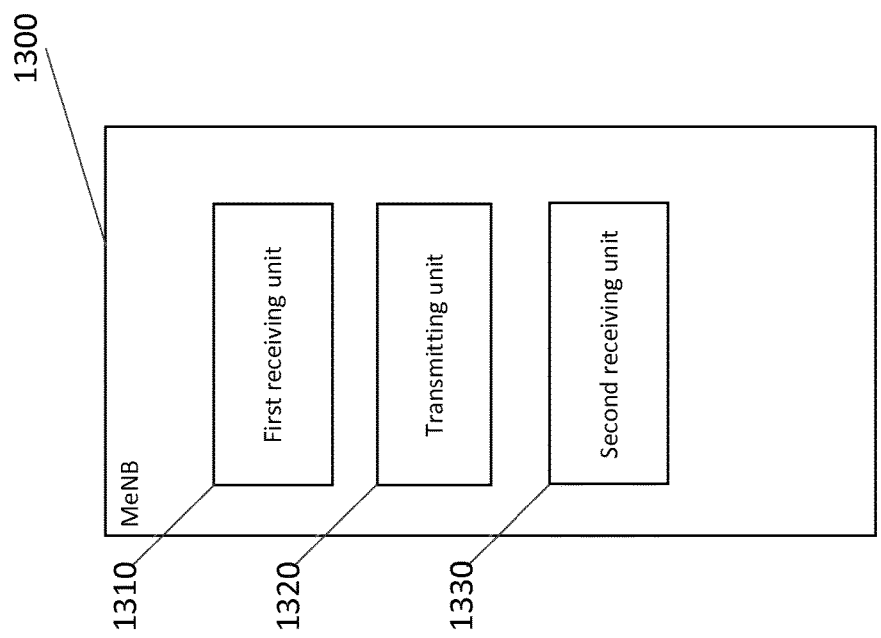
FIG. 13 illustrates an apparatus in accordance with one embodiment.

FIG. 13 illustrates an apparatus in accordance with one embodiment. Apparatus 1300 may comprise a first receiving unit 1310 that receives an indication for support for a broadcast service (e.g. a MBMS) enhancement layer from a first network node. Apparatus 1300 may also comprise a first transmitting unit 1320 that transmits the indication for support for the broadcast service enhancement layer to a second network node. Apparatus 1300 may also comprise a second receiving unit 1330 that receives a broadcast service session request message (e.g., a start request message) from the second network node. The broadcast service session request message may indicate that a broadcast service session is for a base layer or for the enhancement layer.

Figure 14:
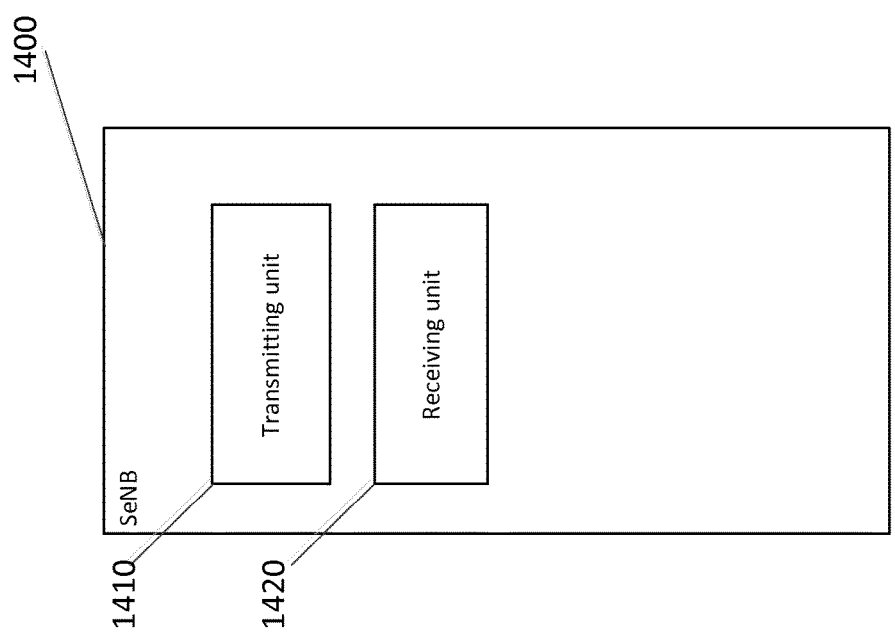
FIG. 14 illustrates an apparatus in accordance with another embodiment.

FIG. 14 illustrates an apparatus in accordance with one embodiment. Apparatus 1400 may comprise a transmitting unit 1410 that transmits an indication for support for a broadcast service (e.g., a MBMS) enhancement layer to a first network node. Apparatus 1400 may also comprise a receiving unit 1420 that receives a broadcast service session request message (e.g., a start request message) from the first network node. The received broadcast service session request message may indicate that a broadcast service session is for the enhancement layer.

Figure 15:
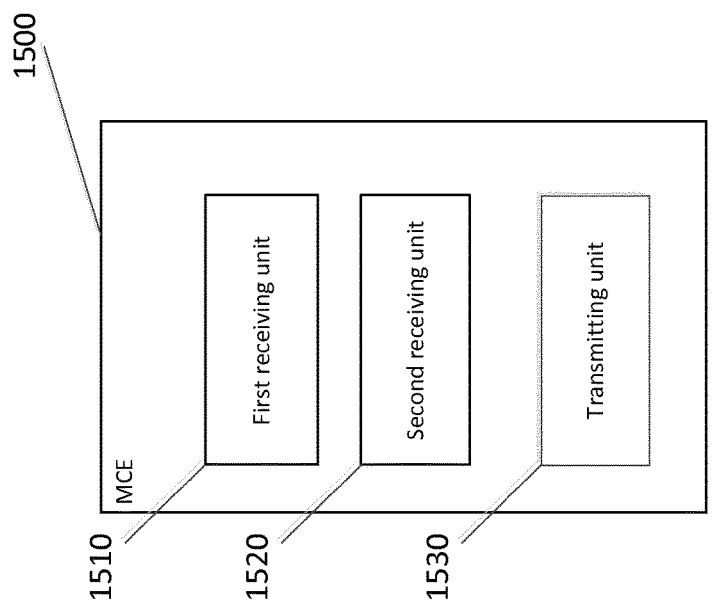
FIG. 15 illustrates an apparatus in accordance with another embodiment.

FIG. 15 illustrates an apparatus in accordance with one embodiment. The apparatus 1500 may comprise a first receiving unit 1510 that receives an indication for support for a broadcast service enhancement layer from a first network node. The apparatus 1500 may also comprise a second receiving unit 1520 that receives a first broadcast service session request message. The first broadcast service session request message may indicate that a broadcast service session is for a base layer or for an enhancement layer. The apparatus 1500 may also comprise a transmitting unit 1530 that transmits a second broadcast service session request message to the first network node, wherein the second broadcast service session request message may indicate that a broadcast service session is for the base layer or for the enhancement layer.

Figure 16:
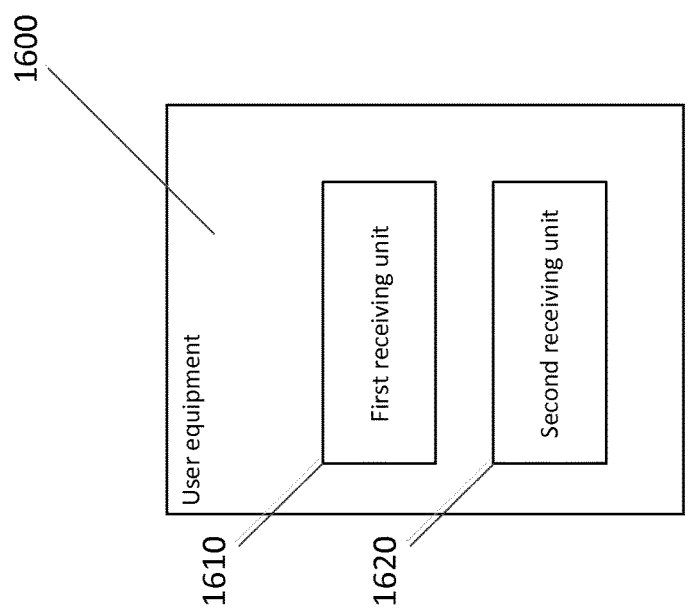
FIG. 16 illustrates an apparatus in accordance with another embodiment.

FIG. 16 illustrates an apparatus in accordance with one embodiment. The apparatus 1600 may comprise a first receiving unit 1610 that receives a broadcast service data related to an enhancement layer from a first network node. The apparatus 1600 may also comprise a second receiving unit 1620 that receives an indication so that the apparatus 1600 can decode the broadcast service data that is transmitted via the first network node.

Figure 17:
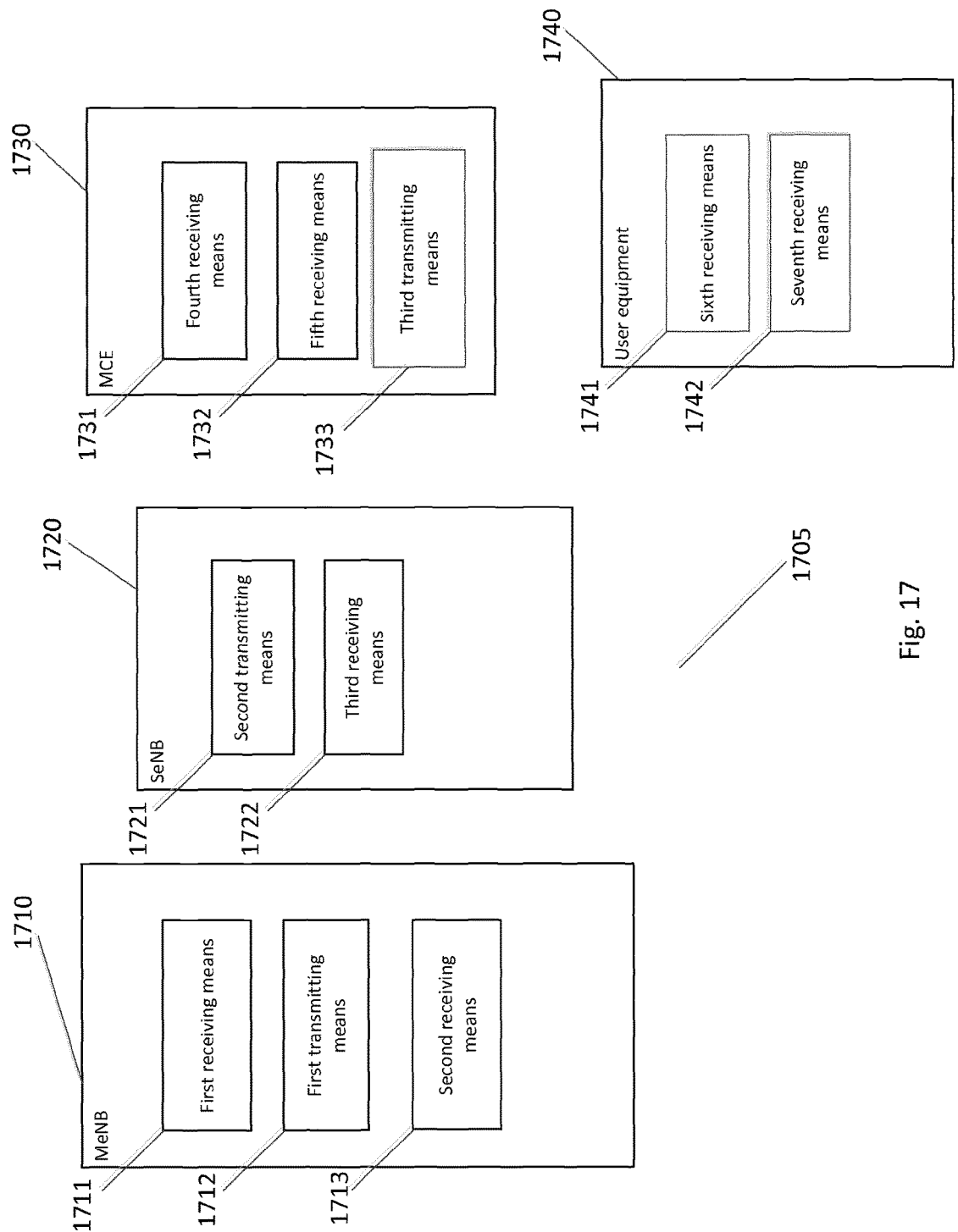
FIG. 17 illustrates a system in accordance with one embodiment.

FIG. 17 illustrates a system in accordance with one embodiment. System 1705 comprises a first apparatus 1710 comprising first receiving means 1711 for receiving an indication for support for a broadcast service (e.g., a MBMS) enhancement layer from a second apparatus. First apparatus 1710 may also comprise first transmitting means 1712 for transmitting the indication for support for the broadcast service enhancement layer to a third apparatus. First apparatus 1710 also comprises second receiving means 1713 for receiving a broadcast service session request message (e.g., a start request message) from the third apparatus. The broadcast service session request message may indicate that a broadcast service session is for a base layer or for the enhancement layer. System 1705 may also comprise a second apparatus 1720 comprising second transmitting means 1721 for transmitting the indication for support for the broadcast service enhancement layer to the first apparatus. Second apparatus 1720 may also comprise third receiving means 1722 for receiving the broadcast service session request message from the first apparatus. The received broadcast service session request message may indicate that a broadcast service session is for the enhancement layer. System 1705 may also comprise a third apparatus 1730 that may comprise fourth receiving means 1731 for receiving the indication for support for a broadcast service enhancement layer from the first apparatus. Third apparatus 1730 may also comprise fifth receiving means 1732 for receiving a first broadcast service session request message, the first broadcast service session request message may indicate that the broadcast service session may be for the base layer or for the enhancement layer. Third apparatus 1730 may also comprise third transmitting means 1733 for transmitting a second broadcast service session request message to the first apparatus. The second broadcast service session request message indicates that a broadcast service session is for the base layer or for the enhancement layer. System 1705 may also comprise a fourth apparatus 1740 that may comprise sixth receiving means 1741 for receiving the broadcast service data related to the enhancement layer from the second apparatus. The fourth apparatus 1740 may also comprise seventh receiving means 1742 for receiving an indication so that the fourth apparatus 1740 can decode the broadcast service data that is transmitted via the second apparatus.

Figure 18:
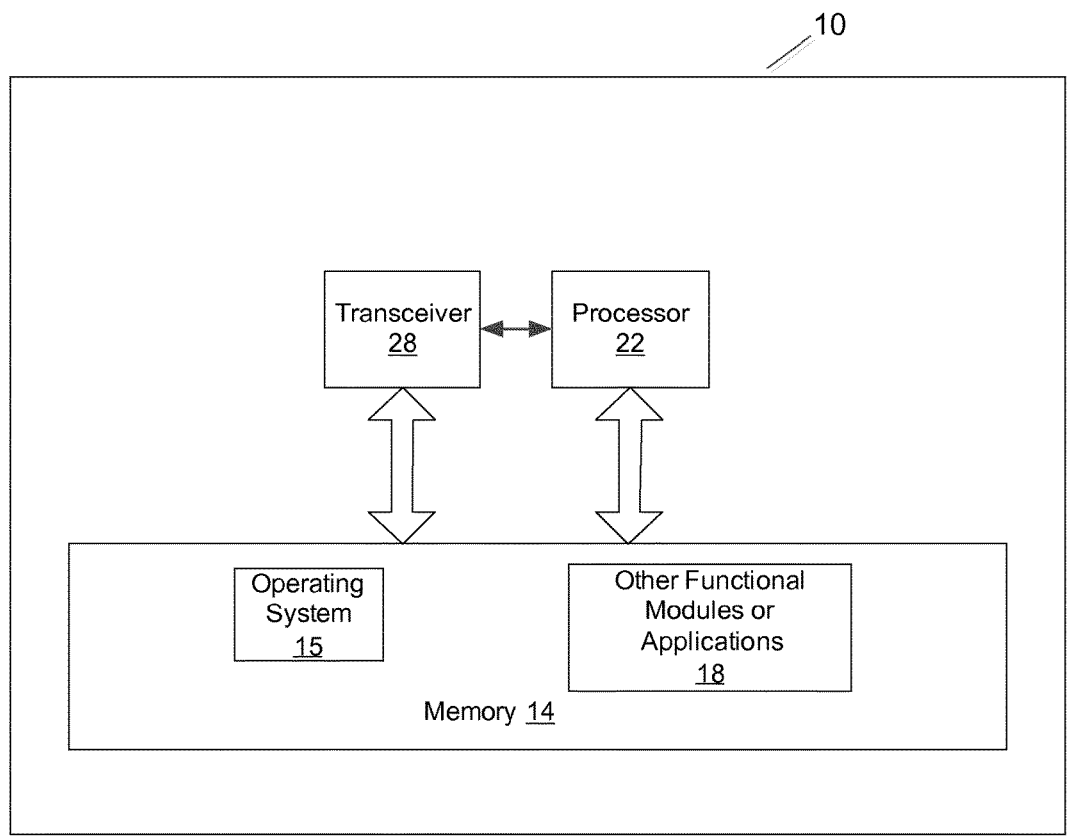
FIG. 18 illustrates an apparatus in accordance with another embodiment.

FIG. 18 illustrates an apparatus 10 according to embodiments of the invention. Apparatus 10 can be a device, such as a UE, for example. In other embodiments, apparatus 10 can be a base station and/or an evolved Node B, for example. Apparatus 10 can also comprise a network node that performs the function of an MCE, for example.

Apparatus 10 can comprise a processor 22 for processing information and executing instructions or operations. Processor 22 can be any type of general or specific purpose processor. While a single processor 22 is shown in FIG. 18, multiple processors can be utilized according to other embodiments. Processor 22 can also comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further comprise a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can comprise program instructions or computer program code that, when executed by processor 22, enable the apparatus 10 to perform tasks as described herein.

Apparatus 10 can also comprise one or more antennas (not shown) for transmitting and receiving signals and/or data to and from apparatus 10. Apparatus 10 can further comprise a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 comprising, without limitation, precoding of antenna gain/phase parameters, encoding and decoding of individual bits forming a communication message, formatting of information, and overall control of the apparatus 10, comprising processes related to management of communication resources.

In certain embodiments, memory 14 stores software modules that provide functionality when executed by processor 22. The modules can comprise an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A first base station comprising:
   at least one processor and at least one memory including a computer program code, wherein the at least one memory and the computer program code are configured, with the at least one processor, to cause the first base station to:
   receive an indication for support for a broadcast service enhancement layer from a second base station;
   transmit the indication for support for the broadcast service enhancement layer to a broadcast service coordination entity;
   receive a broadcast service session request message from the broadcast service coordination entity;
   determine that the broadcast service session request message indicates that a broadcast service session is for an enhancement layer;
   provide a base layer of the broadcast service session to a user equipment having a low data rate connection and to a user equipment having a high data rate connection;
   transmit the broadcast service session request message to the second base station; and
   cause the second base station to transmit the enhancement layer of the broadcast service session to the user equipment having the high data rate connection.

2. The first base station according to claim 1, wherein the first base station comprises a master evolved Node B, the second base station comprises a secondary evolved Node B, and the second network node comprises a multimedia-broadcast-multicast-service-coordination entity wherein the first and second base stations operate in dual connectivity.

3. The first base station according to claim 1, wherein the broadcast service enhancement layer is a multimedia-broadcast-multicast service enhancement layer.

4. The first base station according to claim 1, wherein the at least one memory and the computer program code are configured, with the at least one processor, to cause the first base station to:
   determine a resource allocation for the broadcast service session for the enhancement layer; and
   transmit the resource allocation to the second base station.

5. The first base station according to claim 1, wherein the at least one memory and the computer program code are configured, with the at least one processor, to cause the first base station to:
   receive from the broadcast service coordination entity a resource allocation for the broadcast service session for the enhancement layer; and
   forward the resource allocation to the second base station.

6. The first base station according to claim 1, wherein the at least one memory and the computer program code are configured, with the at least one processor, to cause the first base station to:
   provide an indication to the user equipment having the high data rate connection so that the user equipment having the high data rate connection can decode broadcast service data that is transmitted via the second base station.

7. The first base station according to claim 1, wherein the first base station is on a coverage-oriented frequency layer, and the second base station is on a capacity-oriented frequency layer.

8. The first base station according to claim 1, wherein the at least one memory and the computer program code are configured, with the at least one processor, to cause the first base station to:
   decide that an on-going broadcast service session for the enhancement layer is to be shifted from the second base station to the first base station.

9. The first base station according to claim 8, wherein the deciding is based on a request from the second base station.

10. The first base station according to claim 8, wherein the at least one memory and the computer program code are configured, with the at least one processor, to cause the first base station to:
    transmit an indication to the user equipment having the high data rate connection so that the user equipment having the high data rate connection knows that both the base layer and the enhancement layer are to be broadcasted by the first base station.

11. A second base station comprising:
    at least one processor and at least one memory including a computer program code, wherein the at least one memory and the computer program code are configured, with the at least one processor, to cause the second base station to:
    determine that the second base station supports for a broadcast service enhancement layer;
    transmit an indication for support for the broadcast service enhancement layer to a first base station;
    receive a broadcast service session request message from the first base station;
    determine that the received broadcast service session request message indicates that a broadcast service session is for an enhancement layer; and
    transmit the enhancement layer of the broadcast service session to a user equipment having a high data rate connection, wherein a base layer of the broadcast service session is provided to the user equipment having the high data rate connection and to a user equipment having a low data rate connection by the first base station.

12. The second base station according to claim 11, wherein the second base station comprises a secondary evolved Node B, and the first base station comprises a master evolved Node B, and wherein the first and second base stations operate in dual connectivity.

13. The second base station according to claim 11, wherein the at least one memory and the computer program code are configured, with the at least one processor, to cause the second base station to:

receive a resource allocation for the broadcast service session for the enhancement layer.

14. A method, comprising:
  receiving, by a first base station, an indication for support for a broadcast service enhancement layer from a second base station;
  transmitting the indication for support for the broadcast service enhancement layer to a broadcast service coordination entity;
  receiving a broadcast service session request message from the broadcast service coordination entity;
  determining that the broadcast service session request message indicates that a broadcast service session is for an enhancement layer;
  providing a base layer of the broadcast service session to a user equipment having a low data rate connection and to a user equipment having a high data rate connection;
  transmitting the broadcast service session request message to the second base station; and
  causing the second base station to transmit the enhancement layer of the broadcast service session to the user equipment having the high data rate connection.

15. The method according to claim 14, further comprising:
  determining a resource allocation for the broadcast service session for the enhancement layer; and
  transmitting the resource allocation to the second base station.

16. The method according to claim 14, further comprising:
  receiving from the broadcast service coordination entity a resource allocation for the broadcast service session for the enhancement layer; and
  forwarding the resource allocation to the second base station.

17. The method according to claim 14, further comprising:
  providing an indication to the user equipment having the high data rate connection so that the user equipment having the high data rate connection can decode broadcast service data that is transmitted via the second base station.

18. The method according to claim 14, further comprising:
  deciding that an on-going broadcast service session for the enhancement layer is to be shifted from the second base station to the first base station.

19. The method according to claim 18, wherein the deciding is based on a request from the second base station.

20. The method according to claim 18, further comprising:
  transmitting an indication to the user equipment having the high data rate connection so that the user equipment having the high data rate connection knows that both the base layer and the enhancement layer are to be broadcasted by the first base station.

* * * * *